United States Patent

Maieli et al.

[11] 4,015,787
[45] Apr. 5, 1977

[54] AIRCRAFT WING

[75] Inventors: Joseph R. Maieli, Central Islip; Gordon Rosenthal, Jericho; Domenick T. Torrillo, Dix Hills, all of N.Y.

[73] Assignee: Fairchild Industries Inc., Germantown, Md.

[22] Filed: Nov. 17, 1975

[21] Appl. No.: 632,468

[52] U.S. Cl. ............................ 244/42 DA; 244/113
[51] Int. Cl.² ........................................... B64C 3/50
[58] Field of Search ....... 244/42 CA, 42 D, 42 DA, 244/42 DB, 87, 113, 130, 42 C

[56] References Cited

UNITED STATES PATENTS

| 2,772,058 | 11/1956 | Grant | 244/42 DB |
| 2,899,152 | 8/1959 | Weiland | 244/42 D UX |
| 2,920,844 | 1/1960 | Marshall et al. | 244/130 |
| 3,921,942 | 11/1975 | Bracka | 244/87 |

Primary Examiner—Duane A. Reger
Assistant Examiner—Galen L. Barefoot
Attorney, Agent, or Firm—Michael W. York

[57] ABSTRACT

An aircraft wing having a relatively thin airfoil cross section including a main body portion and a plurality of auxiliary airfoil sections disposed at the trailing edge of the wing and movable relative to the main body portion and to one another. In a normal cruise position the auxiliary sections and the main body portion form a complete airfoil having a substantially contiguous and unbroken exterior airfoil surface which preserves the high speed characteristics of the wing. At least two of the auxiliary sections comprising a leading auxiliary section and a trailing auxiliary section are movable about a common hinge member carried by the main body portion, while another auxiliary section also hingedly connected to the main body portion is positioned relative thereto in response to the position of the other auxiliary sections. The movement of these auxiliary sections is programmed and operable by a position regulating mechanism that is contained within the confines of the relatively thin airfoil and is operable to substantially improve the wings lift generating capability by cooperating to provide a highly cambered airfoil when deployed while simultaneously exposing a duct to channel ram air flow in a manner which will accelerate the flow and augment the boundary layer flow over the airfoil and its deployed auxiliary airfoil sections. The auxiliary sections are also capable of being deployed so that they extend significantly into the airstream above and below the exterior surfaces of the main body portion and thereby spoil the air flow and create an aerodynamic brake which is caused by the exposure of the large surfaces to the airstream and the effective trapping of a large volume of air within the confined duct area fromed by deploying the auxiliary sections in this manner.

3 Claims, 5 Drawing Figures

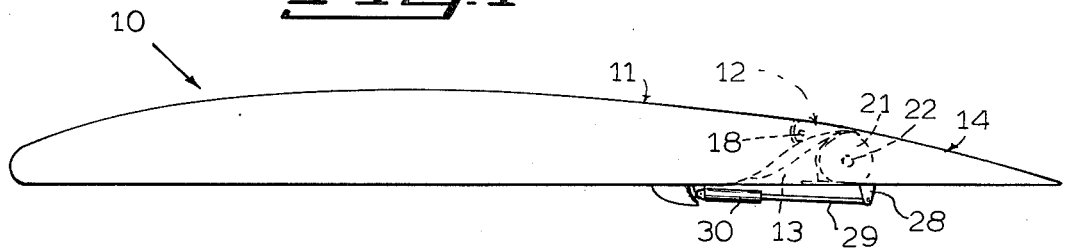
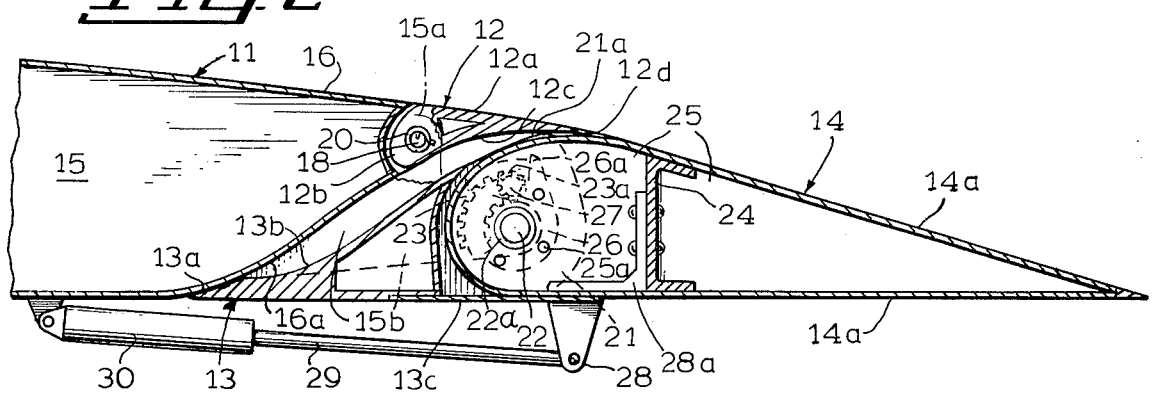
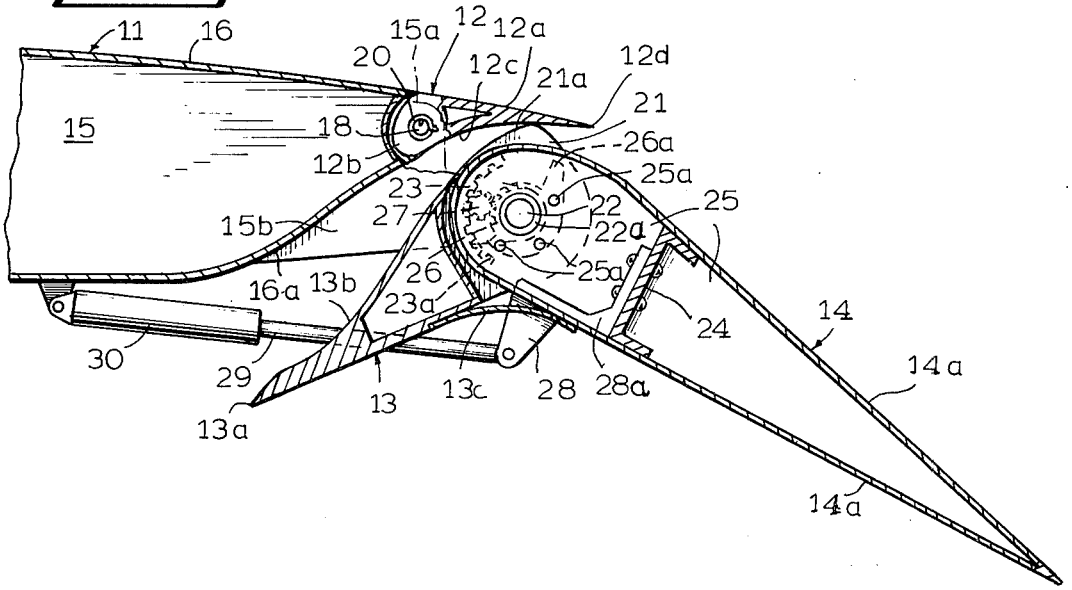

AIRCRAFT WING

BACKGROUND OF THE INVENTION

The development of aircraft and their related components such as wings, wing flaps and the like have been undergoing continuous development and refinement much of which has contributed substantially to the dramatic advances in aircraft performance which have been achieved in recent years. Experiences gained as a result of these advances have brought into sharper focus certain needs and requirements and to some extent created needs where none had previously existed. An example of these is apparent not only with respect to wing and airfoil shapes but also to lift devices which have been incorporated into most modern day aircraft wings such as flaps and blown flaps which induce and augment the aerodynamic flow over the wing and flap surfaces to improve performance. Generally speaking, while such blown flap arrangement are highly effective in enhancing the lifting capabilities of a wing, they also require high temperature gas flows which are usually bled from the aircraft power plant. This is not only detrimental to the performance of the power plant but involves excessive losses and inefficiency caused by skin friction, roughness, bends, joints, leaks and the like.

Several examples of various types of prior art flaps are disclosed in the U.S. Pat. Nos. 2,289,704 and 3,291,420. U.S. Pat. No. 2,289,704 discloses a two-part flap assembly in which one of its parts is independently displaceable from a second part. The second part is displaceable downwardly to a position parallel with and spaced apart from the undersurface of the wing. A tab-like trailing member is also provided and is positionable to control the air flow between the undersurface of the wing and the second part of the flap assembly.

U.S. Pat. No. 3,291,420 discloses a means to form ducts under the surface of a supersonic wing to contribute to its subsonic operation.

As evidenced by these particular prior art patents as well as a variety of others that are readily discernible in the prior art, the development of wing flaps has received considerable emphasis over the years, a fact which gives testimony to the universal appreciation of those skilled in the art to their major contribution to the advances in aircraft performance which have been attainable as a result.

In this connection, the evolution of various flap configurations has resulted in many which have become highly complicated and operable by somewhat sophisticated linkages and controls. Generally, while these configurations have been highly effective their complicated configurations and linkages have made their usage in wing sections of comparatively thin cross section difficult and in some cases impossible without compromising the basic wing design.

Accordingly, the present invention provides an aircraft wing that can have a comparatively thin cross section, having highly effective auxiliary airfoil sections disposed at its trailing edge which are capable of enhancing the lift capabilities of the wing without compromising the wing shape or cross section and which are capable of deployment in such a manner as to spoil the lift and aerodynamically brake the wing.

SUMMARY OF THE INVENTION

This invention relates to aircraft wings and more particularly to a high performance wing that is capable of operation over a wide subsonic and supersonic range.

It is also an object of the present invention to provide an efficient wing with auxiliary airfoil sections which will substantially enhance the lifting capabilities of a high performance wing.

It is also an object of the present invention to provide an efficient wing with auxiliary airfoil sections that is simple and light in weight and which can be operated by a relatively simple control mechanism.

It is also an object of the present invention to provide a high performance wing with auxiliary airfoil sections that is particularly suited to supersonic operation by eliminating gaps in the wing.

It is another object of the present invention to provide a high performance wing with auxiliary airfoil sections which make use of ram air flow to augment the flow over the surfaces of the wing and the auxiliary sections to substantially improve the coefficient of lift of the wing.

It is another object of the present invention to provide a wing having enhanced lifting capabilities that are comparable to those which are obtainable with blown flap arrangements without the attendant disadvantages associated with the use of those arrangements.

It is a still further object of the present invention to provide a wing with auxiliary airfoil sections which can be deployed to spoil the aerodynamic flow over the upper surface of the wing to quickly reduce the lift generated by the wing.

It is also an object of the present invention to provide a wing with auxiliary airfoil sections that are capable of operating as a highly efficient aerodynamic brake to retard the progress of the aircraft with which the wing of the present invention is associated.

The present invention provides an aircraft wing including a main body portion with a plurality of movable auxiliary airfoil sections disposed at its trailing edge, a pair of which comprising a leading auxiliary section and a trailing auxiliary section are movable about a fixed hinge member disposed on the main body portion. The exterior surfaces of the main section and the auxiliary sections conform to the contour of the main body portion when the auxiliary sections are in a neutral position to form a complete airfoil section. The pair of movable auxiliary sections can be deployed to improve the lift of the wing. One of the auxiliary sections may be moved relative to the other to increase the camber formed by two of the auxiliary sections and establish a duct between an auxiliary section and the main body portion which directs and accelerates the ambient flow through the duct to thereby augment aerodynamic circulation and boundary layer flow over the wing surfaces. The auxiliary sections may also operate to spoil the flow over the wing to spoil lift and act as an aerodynamic brake.

BRIEF DESCRIPTION OF THE DRAWINGS

The invention will be hereinafter more fully described with reference to the accompanying drawings in which:

FIG. 1 is an elevational view of a comparatively thin airfoil of a typical wing according to the present invention with movable auxiliary sections shown in dotted lines;

FIG. 2 is an enlarged elevational cross section of the trailing portion of the typical wing shown in FIG. 1 with the movable auxiliary sections situated in a neutral or cruise position;

FIG. 3 is an enlarged elevational cross section of the trailing portion of the typical wing shown in FIG. 2 with the movable auxiliary sections shown in the high lift position;

DETAILED DESCRIPTION OF THE PREFERRED EMBODIMENT

Figure 4:
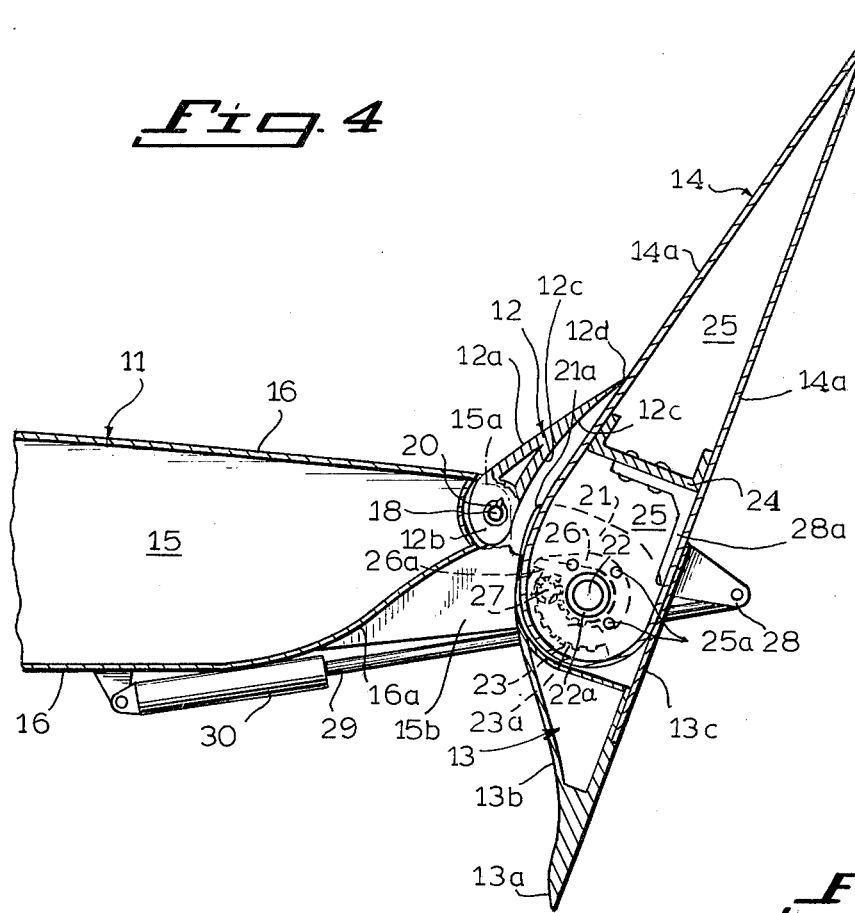
FIG. 4 is an enlarged elevational cross section of the trailing portion of the typical wing shown in FIG. 3 with the movable auxiliary sections shown in the lift spoiling and braking position.

If reference is made to FIG. 1 in the drawings it will be noted that the airfoil of a wing of a comparatively thin cross section, of a type used on high performance aircraft and therefore known as a high performance wing, has been illustrated and generally designated by the reference numeral 10. As is well-known to those skilled in the art, most modern high performance wing airfoils must be configured to reduce drag while exhibiting aerodynamic characteristics which will permit the wing to successfully transcend both the supersonic and subsonic flight profiles in which such aircraft must operate. Frequently the attainment of satisfactory supersonic performance may be achieved only at the expense of low speed performance characteristics. Naturally, the effects of any such inadequate low speed performance is greatly exaggerated and in some cases can even be critical during landings and take-offs. In view of this, a great reliance is placed upon the use of various lift enhancing devices, despite the fact that most are not well suited to the space constraints imposed by the thin airfoils, so that design compromises are often required to tailor the wing airfoil to the lift device or the lift device to the wing.

As will be noted in the drawings, the wing 10 of the present invention is equipped with a main body portion 11 and a plurality of auxiliary airfoil sections 12, 13 and 14 which are disposed at the trailing portion of the main body portion 11 and which are operable to substantially improve the wings low speed performance characteristics. These auxiliary airfoil sections are pivotally connected to the main body portion 11, so that they are each capable of moving relative thereto. As is most apparent in FIG. 1, with the exception of an actuator to operate the auxiliary sections, substantially all of the structure which facilitates the mounting and operation of the auxiliary sections 12, 13 and 14 relative to the main body portion 11 in the manner which will be described in greater detail as we progress, conforms to the contour of the airfoil 10. Consequently, the aerodynamically clean and substantially unbroken exterior surface of the wing 10 is maintained when the auxiliary sections are in a neutral position so that the high performance characteristics of the wing are in no way jeopardized.

Figure 5:
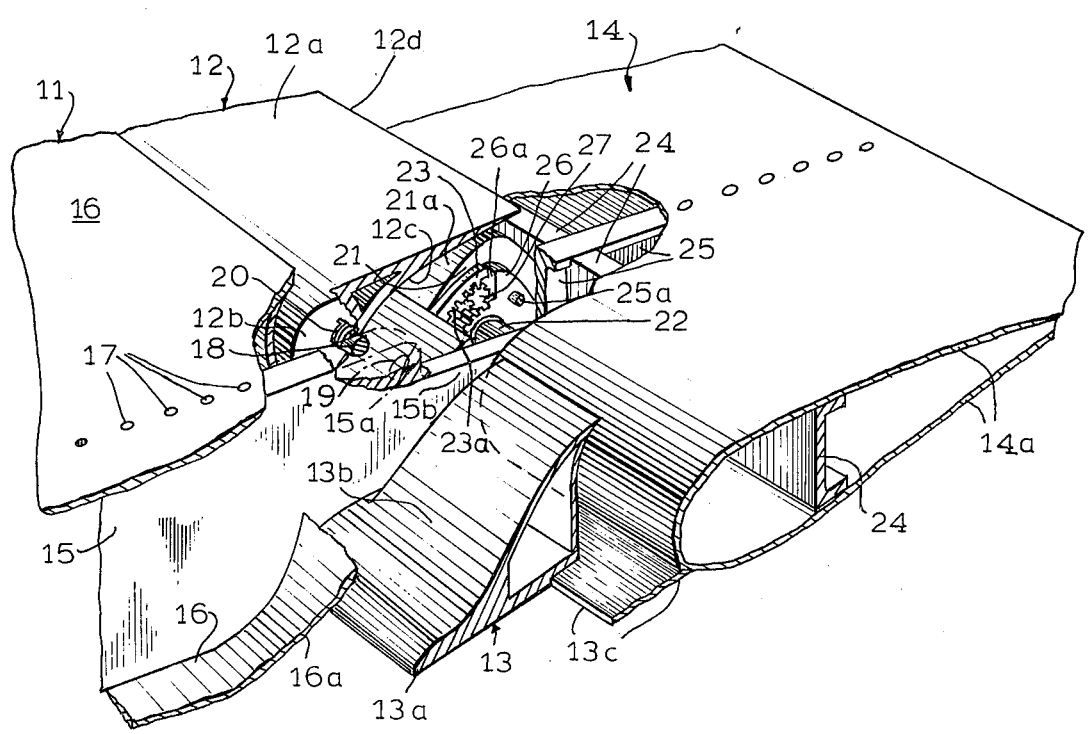
FIG. 5 is a perspective view of a portion of the wing and auxiliary sections shown in FIGS. 1 through 4 with certain parts broken away for clarity, and the auxiliary sections in a neutral or cruise position.

A typical structure of part of a wing and its auxiliary sections according to the present invention is best shown in FIGS. 2, 3, 4 and 5. The main body portion of the wing has a plurality of inner rib members which extend in a spanwise direction (not shown). One of these ribs is shown in the drawings and designated by the reference numeral 15. These ribs provide the required rigidity and form the configuration and contour of the wing airfoil. The rib 15 and its spanwise located counterparts (not shown) also facilitate the mounting of the skin 16 by the rivets 17 as seen in FIG. 5, the outer surface of the skin providing the exterior surfaces of the wing 10. The rib 15 as shown in the drawings, is adapted to serve as a mounting point and part of a hinge means for connecting the auxiliary sections 12, 13 and 14 with the main body portion 11 and is appropriately shaped with projections 15a and 15b at its trailing portion for that purpose. It is obvious to those skilled in the art, that it is not necessary for each wing rib to be equipped with these projections, since the hinged connections are only required at spaced spanwise intervals which is determined on the basis of the necessary structural and configurational considerations to provide the structural integrity required for the particular wing and auxiliary sections.

The auxiliary section 12 may also be referred to as a lip member and as illustrated in the drawings is airfoil shaped and located adjacent to the upper trailing portion of the main body portion 11 so that its upper exterior surface 12a is in essence, a continuation of the upper exterior surface of the main body portion. The auxiliary section 12 is provided with a rather blunt nose 12b which is accommodated by a suitably shaped portion of the adjacent trailing edge of the main body portion 11, and a relatively high negative cambered lower surface 12c which extends toward the trailing edge 12d.

A spanwise extending shaft 18 is adapted to connect the auxiliary section 12 to the main body portion 11 and is fixedly mounted in a suitable aperture 19 provided in the projection 15a of rib 15 and each similar rib (not shown) in the wing 10. The shaft 18 is accommodated within the nose portion 12b of the auxiliary section 12 by a suitable spanwise extending aperture 19 such that the auxiliary section 12 is movable about the fixed shaft 18. A torsion spring 20 which is one of several similar springs (not shown) which are located at various spanwise spaced intervals along the fixed shaft 18 that encircles the shaft and is fixed at one end thereto, while the opposite end is fixed to the nose 12b of auxiliary section 12. The torsion spring 20 is thereby adapted to exert a continuous force on the auxiliary section 12 which urges its trailing edge 12d downwardly. In view of the relatively short chord of the auxiliary section 12 and its function as will hereinafter become more apparent it might appropriately be also referred to as a lip member.

The auxiliary section 13 is situated below the auxiliary section 12 and extends in a forward direction toward the main body portion 11. Auxiliary section 13 is best described as being of a duck bill shape with a curved nose portion 13a and a concave upper surface 13b that blends into a curved portion that is complementary to a curved nose portion of the adjacent auxiliary section 14 which is disposed immediately behind the auxiliary section 13 at the extreme trailing section of the airfoil of the wing 10. The nose portion 13a is adapted to cooperate with and seal against the adjacent portion of the exterior undersurface 16a of the skin 16 near the trailing edge of the main body portion 11 which curves in an upward direction, is slightly convex in shape and blends into the curve of the negative camber of the lower surface 12c of the auxiliary section 12 as seen in FIG. 2 of the drawings. As will be explained in greater detail, the resulting gap between the undersurface 16a of the main body portion 11 and the upper surface 13b of the adjacent auxiliary section 13 provides a duct or passageway which performs an important aerodynamic function when the auxiliary sections are deployed.

However, the sealing relationship of the nose 13a and the skin undersurface 16a of the main body portion 11 when the auxiliary sections are in the neutral high speed cruise position represented in FIGS. 1, 2 and 5, maintains the high performance characteristics of the airfoil by eliminating the drag that would otherwise be caused by exposure of the gap to the airstream during high speed flight of the wing. Similarly, this performance is also maintained by means of a spanwise extending resilient plate 13c which is affixed in normal fashion to the underside of the trailing portion of the auxiliary section 13 so that its exterior surface is comparatively flush with the exterior underside of the auxiliary section 13. This resilient plate is adapted to bridge the gap that exists between the auxiliary section 13 and the adjacent auxiliary section 14 as well as perform other functions which will become more apparent as we progress.

The auxiliary section 13 is also provided with a plurality of enlarged trailing hinge members located at spaced spanwise intervals adjacent to the projection equipped ribs 15 of the main body portion 11. One of these enlarged trailing hinge members is visible in each of the drawing figures, and has been designated by the reference numeral 21. The enlarged hinge member 21 is also furnished with an upper cam surface 21a that is adapted to cooperate with the underside of the auxiliary section 12 to maintain it in position and preserve the gap between it and the auxiliary sections 13 and 14, when those sections are deflected in a manner which will be described in greater detail. A hinge pin 22 is accommodated within each of the enlarged hinge members 21 and is journaled therein by suitable bearings (not shown) to reduce friction and wear. A gear segment 23 is fixedly mounted to the side of the enlarged hinge member 21. The teeth 23a of the segment face toward the hinge pin 22 and are adapted to cooperate with a pinion and gear segment yet to be described. The aforementioned hinge pin 22 also extends through and is similarly journaled near the end of the projection 15b of the rib 15 so that the auxiliary section 13 is movable about the hinge pin 22 with respect to the main body portion 11.

As previously mentioned the auxiliary section 14 is situated and may comprise the extreme trailing edge of the wing airfoil 10 and is connected to the main body portion 11 in a fashion similar to the auxiliary section 13 by the same hinge pin 22 which extends through the projection 15b of rib 15. Auxiliary section 14 is provided with a spanwise extending spar member 24 and a plurality of ribs one of which is shown in the drawings and designated by the reference numeral 25. The ribs 25 provide rigidity to the airfoil of the auxiliary section 14 and facilitate the fastening of the skin 14a as well as the hinged connection of the auxiliary section 14 to the main body portion 11. It should also be understood that suitable slots (not shown) are provided in the skins 16a, 14a and auxiliary section 13 to permit the passage of the projections 15a and 15b and accommodate the hinge member therein. Those ribs 25 in auxiliary section 14 which are situated adjacent the main body portion ribs 15 having projections 15a and 15b are adapted to accommodate the hinge pin 22 in suitable journal bearings 22a. Each of the ribs 25 which accommodates a hinge pin 22 is also provided with a gear segment 26 which is fastened to the side of the rib 25 by the fastener 25a and is provided with a central aperture to permit the passage of the hinge pin 22 therethrough. The gear segment 26 is also provided with an upright projection 26a which is adapted to abut an end of the gear 23 that is fixedly mounted on the enlarged hinge member 21 of the adjacent auxiliary section 13. A pinion 27 is disposed between the segments 23 and 26 such that the pinion teeth are continuously engaged with the teeth on each of the segments. As a consequence, when gear segment 26 is moved in a clockwise direction by movement of the auxiliary airfoil section 14 to which it is attached, the pinion 27 will be driven by the teeth of gear segment 26 and in turn drive gear segment 23 in an opposite direction to move the attached auxiliary section 13 so that both of the auxiliary sections 13 and 14 will be moved a corresponding amount about their common pivot provided by hinge pin 22. However, when the gear segments are in the position corresponding to the neutral or cruise position of their related auxiliary sections 13 and 14 as shown in FIGS. 2, 4 and 5, the projection 26a of the gear segment 26 will abut the end of gear segment 23 thereby preventing relative movement between the auxiliary sections 13 and 14 when the auxiliary section is moved in a counter-clockwise direction.

Auxiliary section 14 is also furnished with a control horn 28 which extends beneath the airfoil section and is supported by a bracket 28a that is fixed to the spar 24. The control horn 28 accommodates a connecting linkage 29 to an actuator 30 which may be mounted in well-known fashion to the main body portion 11. The actuator 30 may be of any conventional variety such as hydraulic, pneumatic or electrical depending only upon the particular actuating system on a particular aircraft. Regardless of type, the actuator 30 will operate to extend or retract the connecting rod of the linkage 29 and thereby move the control horn 28 and auxiliary airfoil section 14 accordingly.

In operation, the wing 10 of the present invention is capable of maintaining the high performance low drag characteristics required by preserving a clean airfoil without any appreciable drag inducing gaps between the auxiliary airfoil sections 12, 13 and 14 disposed at the trailing edge of the wing 10, when these auxiliary sections are in the neutral or cruise position illustrated in FIGS. 1 and 2 of the drawings. As will be obvious in these figures, the lower wing surface is maintained as a substantially contiguous unbroken surface by the sealing relationship between the nose portion 13a of the leading auxiliary section 13 and the skin 16a of the main body section 11 and the resilient plate 13c of the auxiliary section 13 against the undersurface of the trailing auxiliary section 14.

In order to substantially improve the low speed characteristics of the wing 10 which is particularly necessary during take-off and landing maneuvers, auxiliary sections 12, 13 and 14 are operable to produce an exceptionally efficient lift enhancing device for the wing which utilizes the advantages of a ram air flow as best illustrated in FIG. 3. It will be noted therein that the actuator 30 has been energized to retract the connecting linkage 29 causing the control horn 28 to pivot the auxiliary section 14 about the hinge pin 22 so that the trailing edge will be lowered into the airstream. Gear segment 26 fastened to the rib 25 will accordingly move in a clockwise direction driving the pinion 27 in a counter-clockwise direction. The pinion 27 also engaging the teeth 23a of gear segment 23, will cause the gear segment 23 to move in the same direction moving the auxiliary section 13 so that its nose 13a is disengaged from its former sealing relationship with the exterior surface 16a of the skin 16 on the main body portion 11 and into the airstream flowing beneath the airfoil. At the same time, the cam surface 21a on the enlarged hinge member 21 will rotate to maintain the auxiliary section 12 in a relatively stationary position against the force of the torsion spring 20. As a consequence, a passageway is thereby created and is aerodynamically shaped by the convex/concave adjoining surfaces as previously described, which define the main body portion 11 and auxiliary sections as is apparent in FIG. 3. In this manner, ram air flow will be ducted through this passageway which is aerodynamically designed, vis-a-vis the convex/concave curves of the adjacent surfaces 16a and 13b, to accelerate the high velocity flow and put in into communication with the airflow over the upper wing surface to improve boundary layer control and augment aerodynamic circulation over the wing and auxiliary sections thereby improving the lift generating flows over the wing and deflected auxiliary sections in a manner well-known to those skilled in the art. Additionally, as the auxiliary sections 13 and 14 pivot in opposite directions about the hinge pin 22, the resilient plate 13c fastened to the lower trailing surface of the auxiliary section 13 will, at its opposite free end, ride along the undersurface of the adjacent auxiliary section and in so doing be deflected thereby so that it will form a fillet like flow enhancing surface between the auxiliary sections 13 and 14.

The auxiliary sections 13 and 14 are readily restored to the neutral or cruise position by the actuator 30 which will operate to extend the connecting linkage 29 and control horn 28 to push the auxiliary section 14 in a counter-clockwise direction about the hinge pin 22 causing the gear segment affixed thereto to move in a counter-clockwise direction as viewed in the drawings, driving the pinion 27 gear segment 23 and auxiliary section 13 in the opposite direction to return them to the neutral position of FIGS. 1 and 2, whereupon the projection 26a of gear segment 26 will again butt against the end of gear segment 23. In addition, the wing of the present invention may be operated to achieve an outstanding reduction in lift and forward motion of the wing 10, thereby substantially improving the landing and rollout performance of an aircraft equipped with the wing of the present invention. This is accomplished by operating the auxiliary sections 12 and 13 so that they are positioned as shown in FIG. 4, to simultaneously, spoil the airflow over the wing, present a substantial drag area to the airstream and trap part of the flow within a chamber-like area formed by the convex/concave adjacent surfaces of the main body portion 11 and auxiliary sections 12, 13 and 14. In this connection it will be noted in the FIG. 4 representation, that the actuator 30 has been energized to extend the connecting link 29 to its furthermost extended position to move the control horn 28 and auxiliary section 14 in a counter-clockwise direction relative to the hinge pin 22 thereby pushing the trailing edge of the auxiliary section 14 to its extreme elevated position with respect to the upper surface of the main body portion 11 of the wing 10. In moving to this position the gear segment 26 and more particularly the butted engagement of the projection 26a against the end of the gear segment 23 prevents relative movement between the segments 26 and 23 and their respective auxiliary sections 14 and 13. Consequently, both auxiliary sections will move in the same direction about the hinge pin 22 enabling the nose 13a of auxiliary section 13 to extend into the airstream a considerable distance below the undersurface of the main body portion 11.

As the auxiliary section 14 assumes the elevated position its upper surface in contact with the trailing edge 12d of the lip-like auxiliary section 12 causes the auxiliary section to pivot about the hinge shaft 18 against the force exerted by the torsion sping 20, it being understood that as the torsion spring is wound tighter by the upward motion of the trailing edge the sealing engagement between the trailing edge 12 and the auxiliary section 14 will become tighter. When the extreme position has been reached (as shown in FIG. 4), a comparatively tight pocket or chamber will have been found to trap the flow of air scooped into the chamber by the extended nose portion 13a of the auxiliary section 13 thereby acting much like a parachute does in retarding the forward progress of the wing. It should also be noted that the resilient plate 22 fastened to the auxiliary section 13 has not been deflected because of the lack of relative movement between auxiliary sections 13 and 14.

Return of the auxiliary sections 12, 13 and 14 to the neutral or cruise position is readily accomplished when the actuator 30 is energized to retract the connecting link 29 pulling the control horn 28 and auxiliary section 14 in a clockwise direction about the hinge pin 22. Since the forward speed of the wing has been substantially reduced at this time any resistance to the retraction of the auxiliary section 13 is readily overcome by the spanwise extending spring force exerted by the resilient plate 13c which tends to restore the straight line relationship of the undersurfaces of the auxiliary sections 13 and 14. However, if circumstances should justify a more positive return, linkage to restore the auxiliary section 13 to the neutral position could be easily incorporated in the actuator linkage by one skilled in the art. Moreover, it will be appreciated that the lip-like auxiliary section 12 could also be conveniently used as a lift spoiler for lateral or roll control. Accordingly, suitable control means may be incorporated to facilitate the operation of the auxiliary section 12 in this manner in addition to the functions described herein, can readily be supplied by those skilled in the art.

Although the invention has been described with reference to certain preferred embodiments, it will be understood that variations and modifications may be made within the spirit and scope of the invention as defined in the appended claims.

What is claimed is:

1. An aircraft wing comprising in combination a main body portion, a plurality of movable auxiliary sections disposed at the trailing edge of said main body portion, said movable auxiliary sections comprising a leading auxiliary section and a trailing auxiliary section, hinge means operably connecting said auxiliary sections and said main body portion, said hinge means including a fixed hinge member disposed on said main body portion and connecting said leading and trailing auxiliary sections to the main body portion, said leading and trailing auxiliary sections being movable about said fixed hinge member relative to said main body portion and one another and connecting means disposed within said auxiliary sections for connecting said auxiliary sections and for causing said leading auxiliary section and said trailing auxiliary section to move about said fixed hinge member simultaneously, said connecting means disposed between said leading and trailing auxiliary sections being operable to lock said leading and trailing auxiliary sections when said trailing section is partially deployed above the wing.

2. The aircraft wing of claim 1 further comprising a resilient member disposed on the lower exterior surface of said leading auxiliary section, said resilient member being fixed to one of said auxiliary sections and extending toward and abutting against an exterior surface of an adjacent auxiliary section.

3. The aircraft wing of claim 1 wherein said plurality of movable auxiliary sections includes a third auxiliary section in addition to said leading and trailing auxiliary section and said leading auxiliary section has a cam surface adapted to contact said third auxiliary section.

* * * * *